US010992178B1

(12) United States Patent
Huang et al.

(10) Patent No.: US 10,992,178 B1
(45) Date of Patent: Apr. 27, 2021

(54) POWER AND SIGNAL TRANSMISSION DEVICE FOR SPINDLE OF MACHINE TOOL

(71) Applicant: INDUSTRIAL TECHNOLOGY RESEARCH INSTITUTE, Hsinchu (TW)

(72) Inventors: Yu-Shiang Huang, Taichung (TW); Jenq-Shyong Chen, Taichung (TW); Shi-Jie Luo, Yuanlin (TW); Shou-Xuan Chang, Taichung (TW); Yung-Chao Chan, Taichung (TW); Szu-Chia Lin, Yilan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/719,019

(22) Filed: Dec. 18, 2019

(30) Foreign Application Priority Data

Oct. 23, 2019 (TW) .................................. 108138310

(51) Int. Cl.
*B23B 31/16* (2006.01)
*H02J 50/10* (2016.01)
*B23Q 1/00* (2006.01)

(52) U.S. Cl.
CPC .............. *H02J 50/10* (2016.02); *B23B 31/16* (2013.01); *B23Q 1/0027* (2013.01)

(58) Field of Classification Search
CPC .... B23B 31/16; B23Q 1/0009; B23Q 1/0027; B23Q 1/34; B24B 1/04; H02J 50/10; H02J 50/12; H02J 50/80
See application file for complete search history.

(56) References Cited

U.S. PATENT DOCUMENTS

2005/0172506 A1* 8/2005 Collingwood ....... B23Q 1/0009
33/561
2007/0068025 A1* 3/2007 Harding ............... B23Q 1/0009
33/561
(Continued)

FOREIGN PATENT DOCUMENTS

CN 103500867 A 1/2014
CN 204294942 U 4/2015
(Continued)

OTHER PUBLICATIONS

Chen et al., "Non-contact power transmission ultrasonic vibration assisted comprehensive processing machine", total 2 pages.
(Continued)

*Primary Examiner* — Levi Gannon
(74) *Attorney, Agent, or Firm* — Birch, Stewart, Kolasch & Birch LLP (57) ABSTRACT

A power and signal transmission device for a spindle of a machine tool is provided. The power and signal transmission device includes a spindle fixing portion, a shaft rotating portion, a power transmission component and a signal transmission component. The spindle fixing portion is provided with a power input end, a primary side power induction coil, a secondary side signal induction coil and at least one signal output end. The shaft rotating portion is provided with a joining end surface for bonding to a holder, a secondary side power induction coil and a primary side signal induction coil, and is rotatable with respect to the spindle fixing portion. The power transmission component transmits an electrical energy from the power input end. The signal transmission component transmits a holder signal to the signal output end. Each of the power and signal transmission components includes at least one elastic pogo pin.

8 Claims, 8 Drawing Sheets

(56) References Cited

U.S. PATENT DOCUMENTS

| | | | |
|---|---|---|---|
| 2014/0212236 A1* | 7/2014 | Veittinger | B23Q 17/002 409/79 |
| 2014/0295755 A1* | 10/2014 | Graf | H04B 5/0093 455/41.1 |
| 2015/0333795 A1* | 11/2015 | Steudtner | H04B 10/807 398/115 |
| 2015/0352713 A1* | 12/2015 | Takazakura | B23B 37/00 173/2 |
| 2016/0121143 A1 | 5/2016 | Mumaw et al. | |
| 2016/0312505 A1* | 10/2016 | Wuerth | H02J 50/10 |
| 2017/0080537 A1* | 3/2017 | Schwenk | B23Q 1/0009 |
| 2018/0359001 A1* | 12/2018 | Grosse | E05D 11/0081 |

FOREIGN PATENT DOCUMENTS

| | | |
|---|---|---|
| CN | 107835723 A | 3/2018 |
| CN | 207572586 U | 7/2018 |
| CN | 109500410 A | 3/2019 |
| JP | 5-208349 A | 8/1993 |
| TW | 201021961 A | 6/2010 |
| TW | 201100193 A1 | 1/2011 |
| TW | M424210 U1 | 3/2012 |
| TW | 201914733 A | 4/2019 |

OTHER PUBLICATIONS

Chen, "Focus on new applications in cutting processing, Focus on ultrasonic solutions", 2019, total 5 pages.

Chen, "Research on energy transfer by ultrasonic transducers", 2008, total 53 pages.

Huang, "Cutting tool for hard, brittle and hard-to-cut materials—development and application of ultrasonic spindle technology", 2015, total 33 pages.

Liu, "Automation Frequency Tracing of Ultrasonic Vibration Assisted Machining", 2014, total 113 pages.

Pogue, "Get rid of the power cord", 2018, total 3 pages.

Tang, "Farewell to the wired age, Wireless charging, Great liveration of life", 2018, total 6 pages.

Tsai et al., "Research on Ultrasonic Vibration Assisted Machining of Hard-to-cut Materials", 2019, total 11 pages.

Tsao, "Study on the Scan and Tracing Frequency System for Ultrasonic Vibration-Assisted Machining", 2010, total 16 pages.

Yang et al., "Research on Ultrasonic Vibration Assisted Machining on Tempered Glass Material", 2010, total 11 pages.

Taiwanese Office Action and Search Report dated May 20, 2020, for Taiwanese Application No. 108138310.

* cited by examiner

POWER AND SIGNAL TRANSMISSION DEVICE FOR SPINDLE OF MACHINE TOOL

This application claims the benefit of Taiwan application Serial No. 108138310, filed Oct. 23, 2019, the disclosure of which is incorporated by reference herein in its entirety.

TECHNICAL FIELD

The disclosure relates in general to a transmission device, and more particularly to a power and signal transmission device for a spindle of a machine tool.

BACKGROUND

In response to the rapid development in the application of composite material, the ultrasonic processing technology has become more and more popular. To meet the high-speed requirement of the spindle, early brush conduction method may easily result in abrasion or cause damage. Furthermore, due to high-speed friction, the brush may even generate sparks which affect high-speed operation.

Furthermore, early circuit design of the power transmission component is too complicated and is susceptible to damages. To the worse, the production line may come to a standstill and the repair may take a long time. Therefore, it has become a prominent task for the industries to effectively resolve the problem of power transmission and provide a power transmission component having the features of small volume, huge current resistance, and easy maintenance.

SUMMARY

The disclosure is directed to a power and signal transmission device for a spindle of a machine tool. The features of frequent assembly/disassembly elements are used in the electric energy and/or signal transmission components of the spindle to overcome the complication of mechanical conduction design (such as brush), not only greatly simplifying electrical conduction, but also prolonging the lifespan, stabilizing conduction, and meeting the requirement of quick replacement of the kit.

According to one embodiment, a power and signal transmission device for a spindle of a machine tool is provided. The power and signal transmission device includes a spindle fixing portion, a shaft rotating portion, a power transmission component and at least one signal transmission component. The spindle fixing portion is provided with a power input end, a primary side power induction coil, a secondary side signal induction coil and at least one signal output end. The shaft rotating portion is provided with a joining end surface for bonding to a holder, a secondary side power induction coil and a primary side signal induction coil, wherein the shaft rotating portion is rotatable with respect to the spindle fixing portion. The power transmission component is disposed on the joining end surface of the shaft rotating portion and is coupled to the secondary side power induction coil for transmitting an electrical energy from the power input end. At least one signal transmission component is disposed on the joining end surface of the shaft rotating portion and is coupled to the primary side signal induction coil for transmitting a holder signal to the signal output end. Each of the power transmission component and the at least one signal transmission component individually includes at least one elastic pogo pin.

The above and other aspects of the disclosure will become better understood with regard to the following detailed description of the preferred but non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Detailed descriptions of the disclosure are disclosed below with a number of embodiments. However, the disclosed embodiments are for explanatory and exemplary purposes only, not for limiting the scope of protection of the disclosure. Similar/identical designations are used to indicate similar/identical elements. Directional terms such as above, under, left, right, front or back are used in the following embodiments to indicate the directions of the accompanying drawings, not for limiting the present disclosure.

According to an embodiment of the disclosure, a power and signal transmission device for a spindle of a machine tool is provided. The holder and the spindle end are electrically connected by frequent assembly/disassembly elements (such as elastic pogo pins or spring connectors, also referred as pogo pin connectors) for transmitting an electric energy of the spindle end to the holder and/or transmitting a holder signal back to the spindle end. Then, the holder signal is transmitted back to the controller at the spindle end via the electromagnetic induction of the primary side induction coil and the secondary side induction coil. The design of the disclosure is simple and robust.

Figure 1:
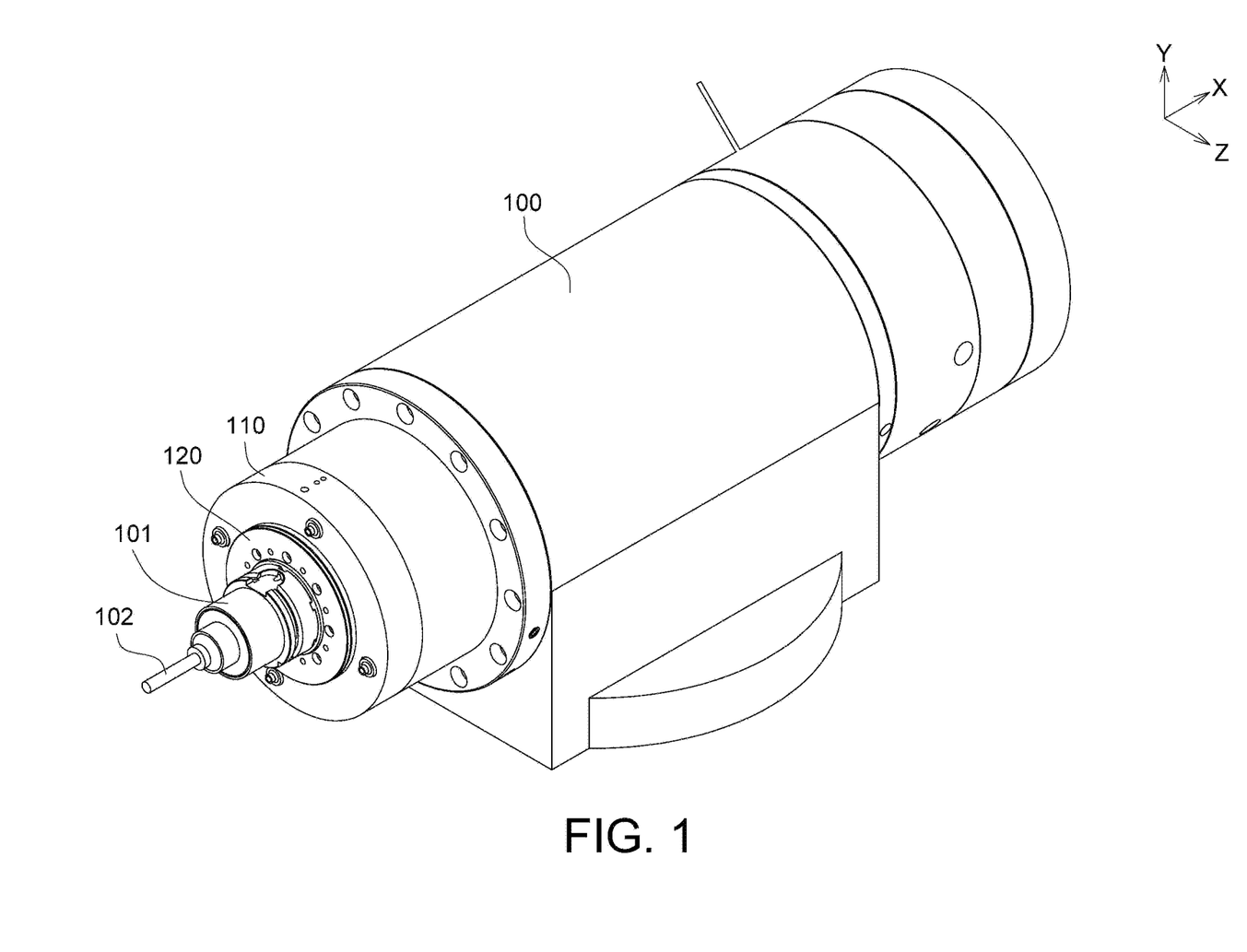
FIG. 1 is an assembly diagram of a spindle and a holder according to an embodiment of the disclosure.
Figure 2:
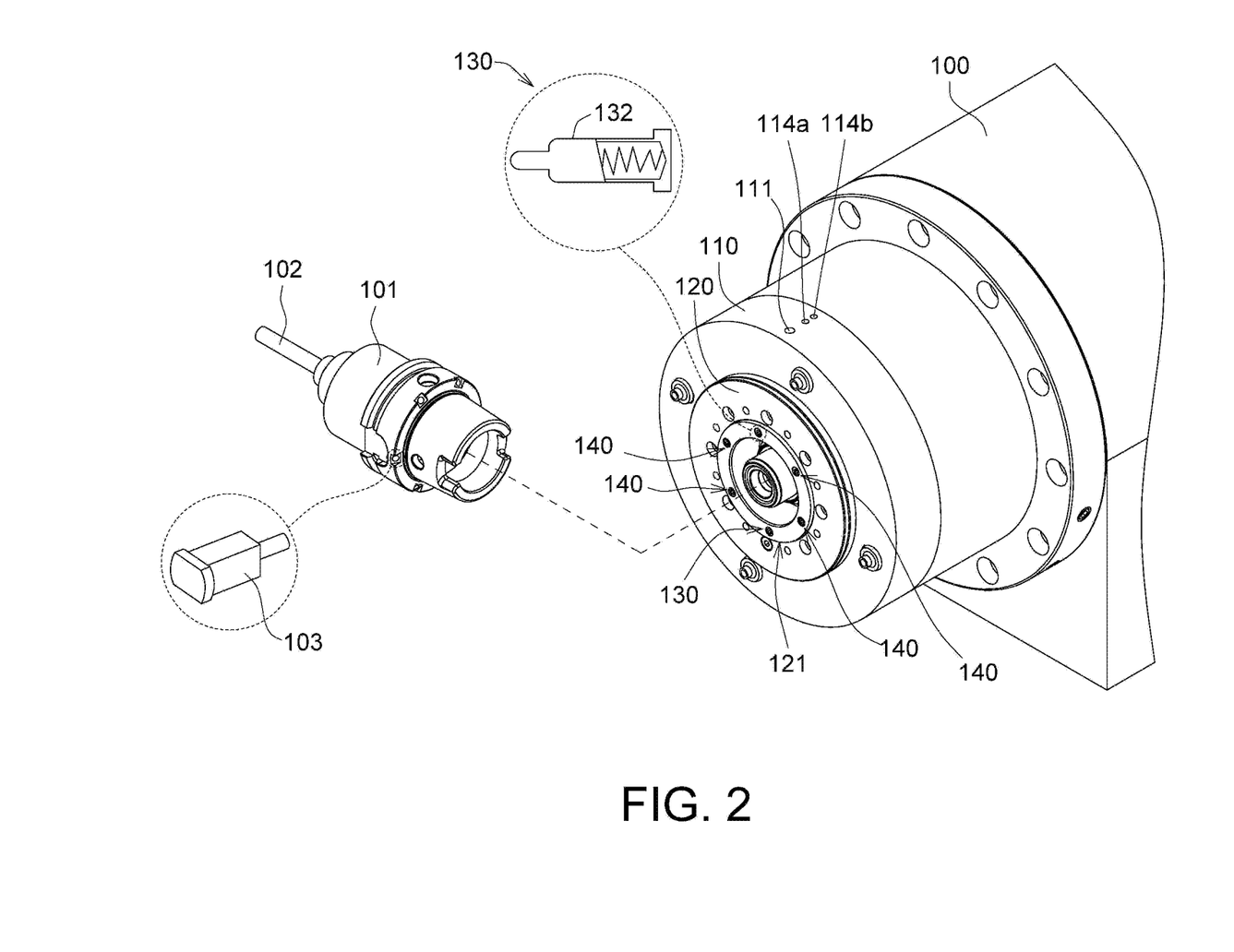
FIG. 2 is an explosion diagram and partial enlargements of a spindle and a holder according to an embodiment of the disclosure.
Figure 4:
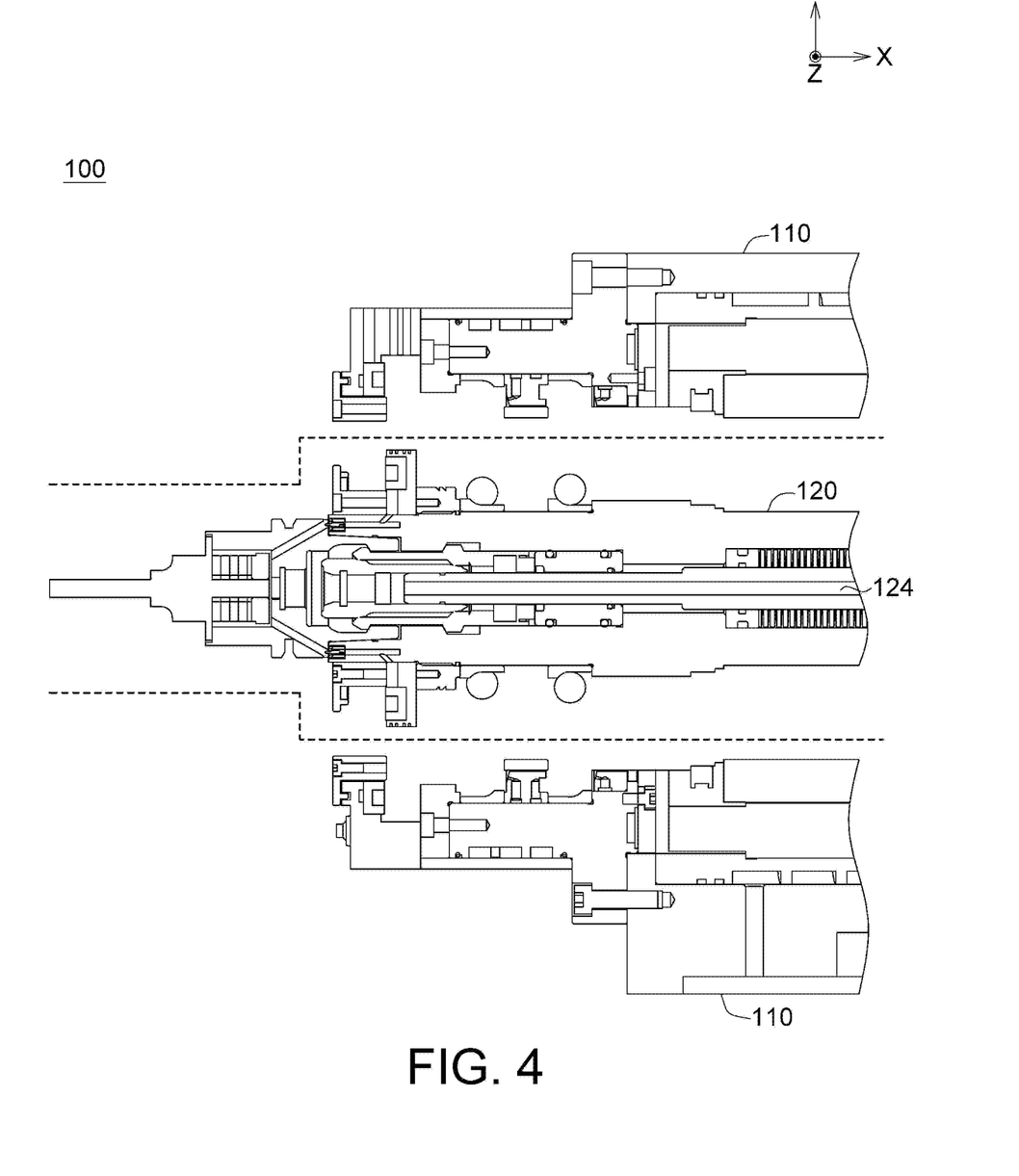
FIG. 4 is a configuration diagram of a spindle fixing portion and a shaft rotating portion separated by dotted lines.

Referring to FIGS. 1 and 2, an assembly diagram, an explosion diagram and partial enlargements of a spindle 100 and a holder 101 according to an embodiment of the disclosure are shown. The spindle 100 includes a spindle fixing portion 110, a shaft rotating portion 120, a power transmission component 130 and at least one signal transmission component 140. The shaft rotating portion 120 is rotatable with respect to the spindle fixing portion 110. That is, the shaft rotating portion 120 can be rotatably disposed in the spindle fixing portion 110. As indicated in FIG. 4, the component inside the dotted lines represents the rotatable shaft rotating portion 120, and the component outside the dotted lines represents the non-rotatable spindle fixing portion 110.

The holder 101 is bonded to the terminal surface of the shaft rotating portion 120. Furthermore, the holder 101 can be detachably bonded to the shaft rotating portion 120. In an embodiment, a knife 102 is bonded to the holder 101 for processing a workpiece.

The power transmission component 130 is disposed on the joining end surface 121 of the shaft rotating portion 120 (that is, an end surface bonded to the holder 101) for transmitting an electric energy to the holder 101. Furthermore, the signal transmission component 140 is disposed on the joining end surface 121 of the shaft rotating portion 120 (that is, an end surface bonded to the holder 101) for transmitting a signal of the holder 101 to the spindle 100.

Refer to the partial enlargements of FIG. 2. The power transmission component 130 and the signal transmission component 140 can be realized by plural annular elastic pogo pins 132 (only one is illustrated) disposed on the joining end surface 121 of the shaft rotating portion 120. The quantity of elastic pogo pins 132 is exemplified by 6, but the disclosure is not limited thereto. Besides, the quantity of power transmission components 130 is such as 2, and the quantity of signal transmission components 140 is such as 4. Two sets of signal transmission components 140 are provided but not limited, and each set has two signal transmission components 140. The first set of signal transmission components 140 is configured to transmit a vibration sensing signal corresponding to an acceleration gauge 105 inside the holder 101 (referring to FIG. 3A). The second set of signal transmission components 140 is configured to transmit a temperature sensing signal corresponding to a thermometer 106 inside the holder 101 (referring to FIG. 3A).

Refer to another partial enlargement of FIG. 2. The holder 101 is provided with plural metal sheets 103 opposite to the power transmission component 130 and the elastic pogo pins 132 of the signal transmission component 140. The elastic pogo pins 132 are annularly disposed on the joining end surface 121 of the shaft rotating portion 120, such that when the holder 101 and the shaft rotating portion 120 are bonded, the force applied to the elastic pogo pins 132 is parallel to the axial direction X of the shaft rotating portion 120, and each elastic pogo pin 132 electrically contacts the metal sheet 103 of the holder 101 in the axial direction X. In the present embodiment, the metal sheets 103 are annularly disposed on the terminal surface of the holder 101 and are opposite to the elastic pogo pins 132.

Figure 3A:
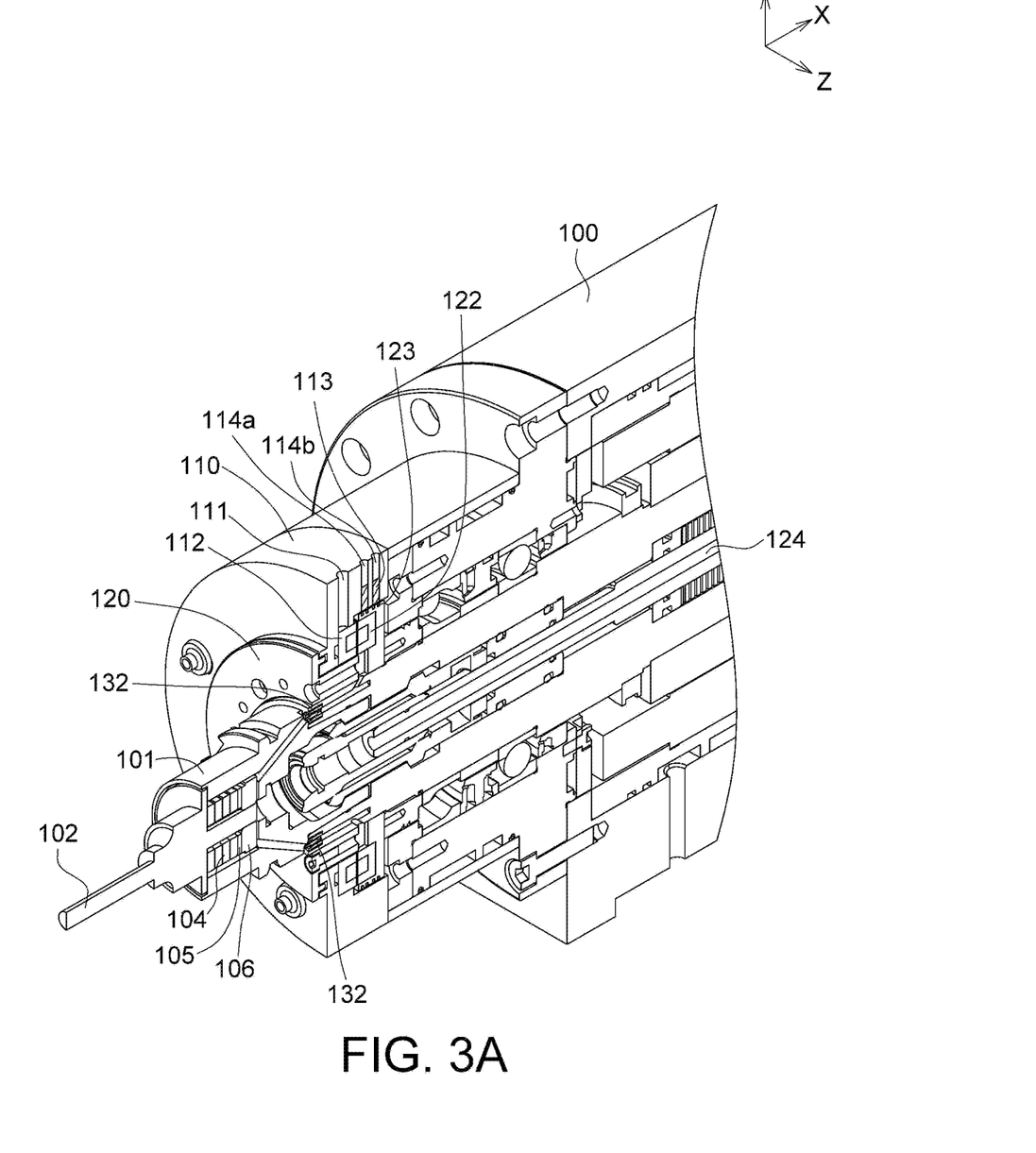
FIG. 3A is a cross-sectional view of a spindle and a holder according to an embodiment of the disclosure.
Figure 3B:
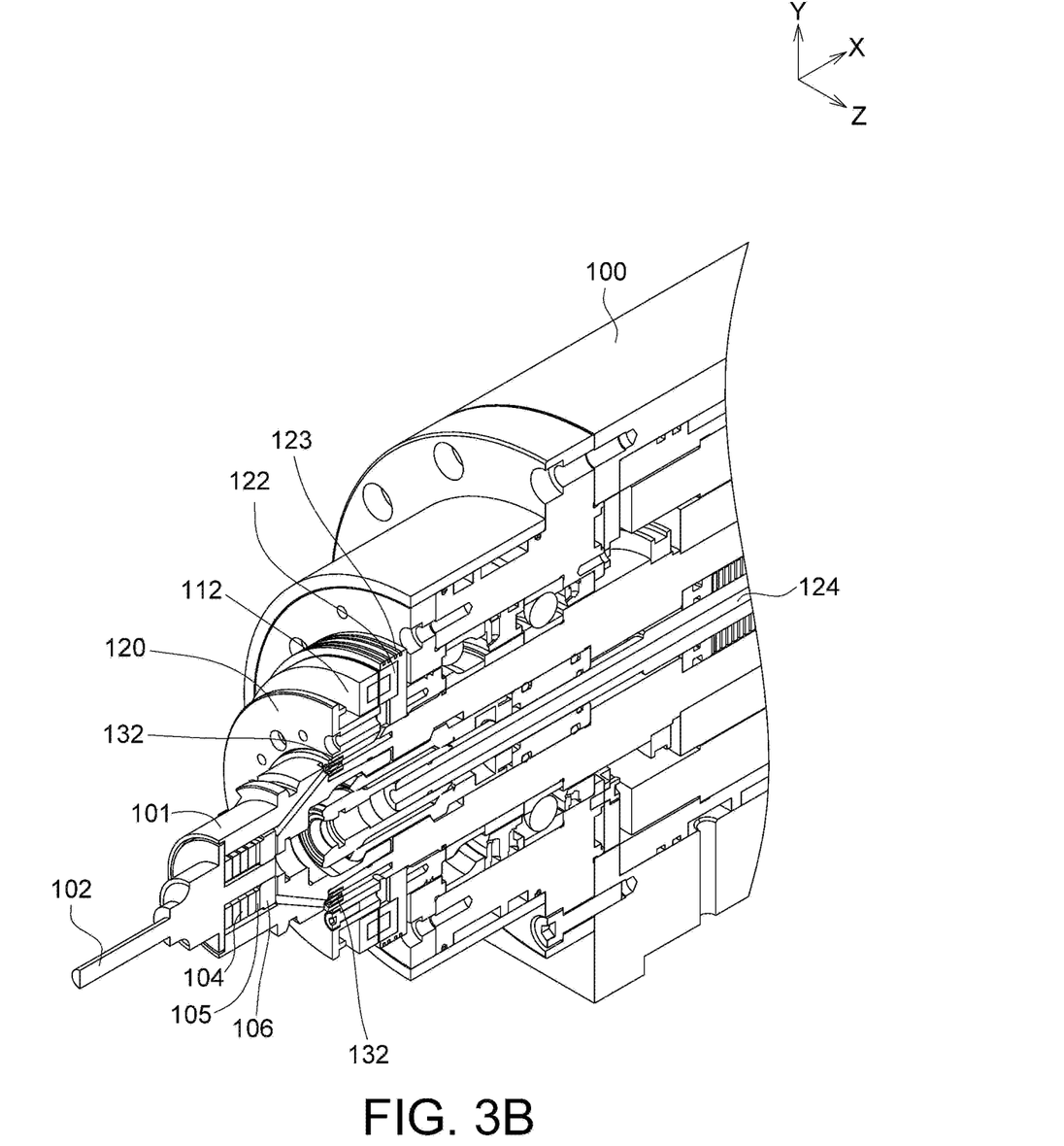
FIG. 3B is a cross-sectional view of a spindle and a holder according to an embodiment of the disclosure, wherein the outer annular portion of the spindle fixing portion is omitted.

Referring to FIGS. 3A and 3B, cross-sectional views of a spindle 100 and a holder 101 according to an embodiment of the disclosure are shown. The holder 101 is provided with an oscillator 104, an acceleration gauge 105, a thermometer 106 and metal sheets 103. The oscillator 104 causes the knife 102 connected to the holder 101 to vibrate. The oscillator 104 can be formed by a vibration element such as a capacitor element, a piezoelectric element or a piezoelectric ceramic piece, and can be driven by the electric energy to generate a high frequency oscillation which directly or indirectly causes the knife 102 disposed on the holder 101 to vibrate. The oscillating frequency of the oscillator 104 can reach 10 kHz, but the disclosure is not limited thereto. In the present embodiment, the oscillator 104 can connect a controller of the machine tool. Based on the features of the workpiece under processing, the controller can correspondingly output a control signal to the oscillator 104 for outputting a corresponding vibration waveform and a corresponding vibration frequency.

Moreover, the spindle fixing portion 110 is provided with a power input end 111, a primary side power induction coil 112, a secondary side signal induction coil 113 and two signal output ends 114a and 114b. The shaft rotating portion 120 is provided with plural sets of elastic pogo pins 132, a secondary side power induction coil 122, a primary side signal induction coil 123 and a rotating shaft 121.

The primary side power induction coil 112 and the secondary side power induction coil 122 are disposed adjacently without contacting each other. That is, the primary side power induction coil 112 and the secondary side power induction coil 122 respectively surround two opposite surfaces of the shaft rotating portion 120 and the spindle fixing portion 110 and are annularly distributed around the shaft rotating portion 120 and the spindle fixing portion 110, such that the primary side power induction coil 112 and the secondary side power induction coil 122 are opposite to each other in the axial direction X and generate an electromagnetic induction in the axial direction X.

Besides, the primary side signal induction coil 123 and the secondary side signal induction coil 113 are disposed adjacently without contacting each other. That is, the primary side signal induction coil 123 and the secondary side signal induction coil 113 respectively surround two opposite surfaces of the shaft rotating portion 120 and the spindle fixing portion 110 and are annularly distributed around the shaft rotating portion 120 and the spindle fixing portion 110, such that the primary side signal induction coil 123 and the secondary side signal induction coil 113 are opposite to each other in the radial direction Y and generate an electromagnetic induction in the radial direction Y.

Since the induction direction of the primary side signal induction coil 123 and the secondary side signal induction coil 113 on the radial direction Y of the rotating shaft 121 is perpendicular to the induction direction of the primary side power induction coil 112 and the secondary side power induction coil 122 on the axial direction X of the rotating shaft 121, electromagnetic interference can be avoided.

Figure 3C:
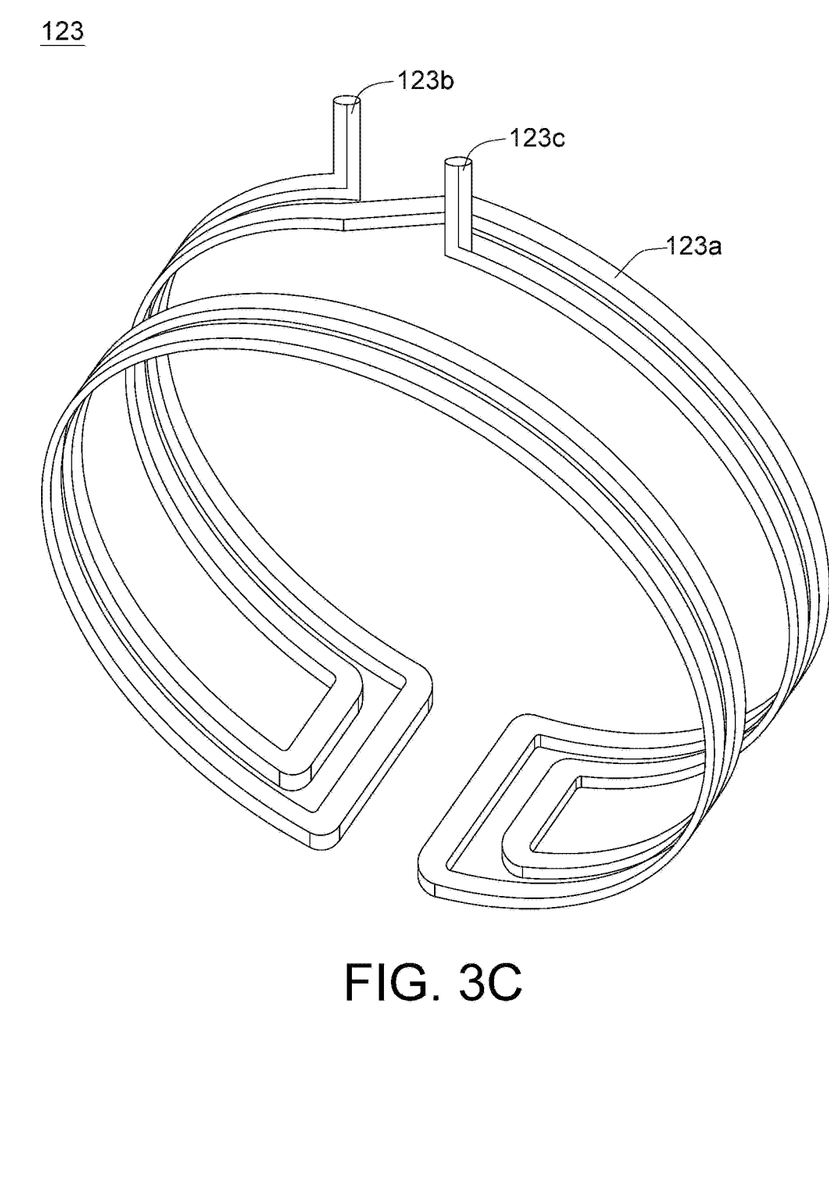
FIG. 3C is a winding diagram of the primary side signal induction coil of FIG. 3B.

Referring to FIG. 3C, a winding diagram of the primary side signal induction coil 123 of FIG. 3B is shown. The primary side signal induction coil 123 includes a set of annular windings 123a, an inlet portion 123b and an outlet portion 123c. The inlet portion 123b and the outlet portion 123c respectively are connected to two corresponding elastic pogo pins 132 via wires to form a signal loop. As indicated in FIG. 3B, each set of windings can be recessed into the groove on the outer annular surface of the shaft rotating portion 120 and can rotate along with the rotation of the shaft rotating portion 120. In FIG. 3A, the secondary side signal induction coil 113 may include a set of annular windings and can be recessed in the groove on the inner annular surface of the spindle fixing portion 110. The winding method of the secondary side signal induction coil 113 is similar to that of the primary side signal induction coil 123, and therefore is not illustrated again.

Figure 5:
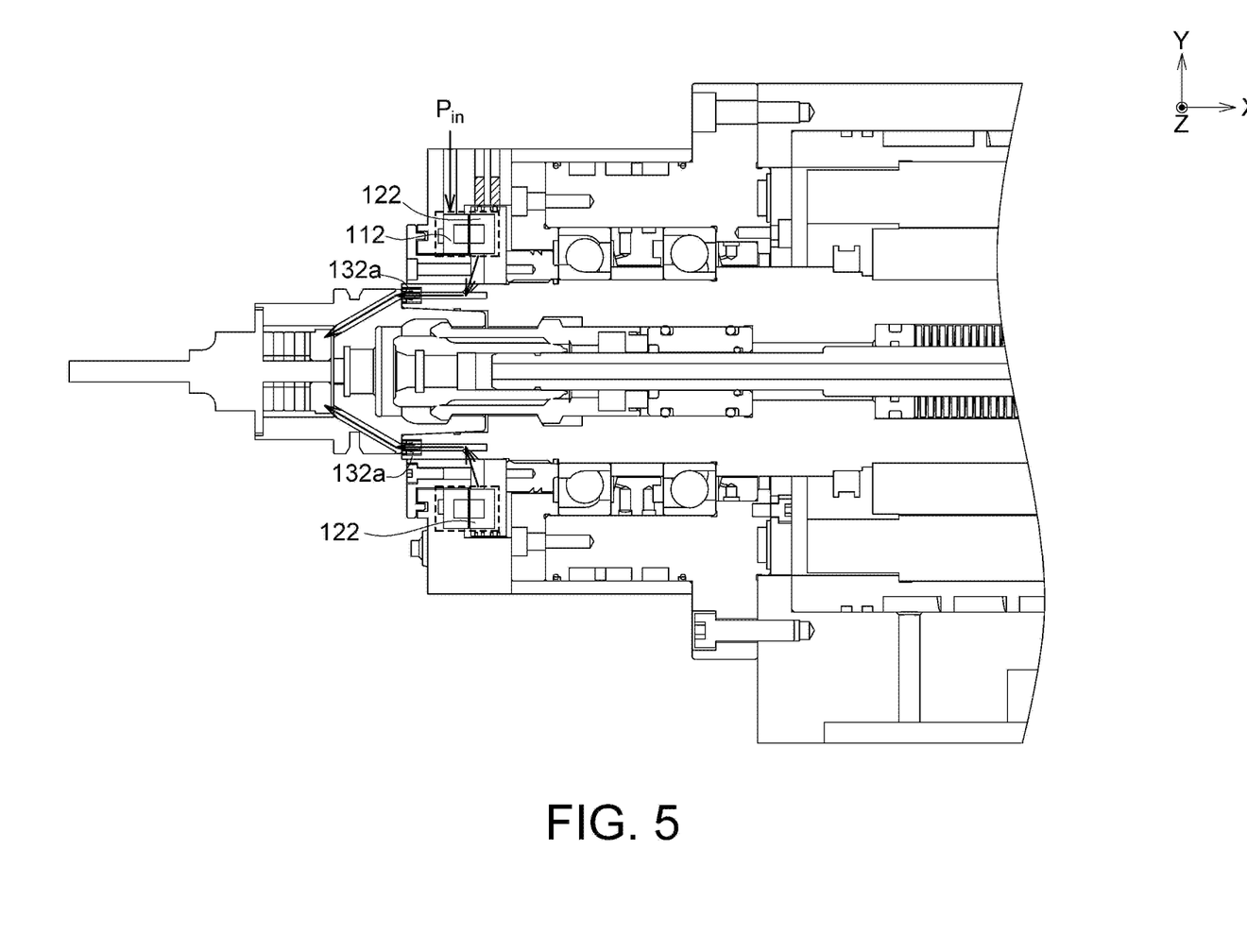
FIG. 5 is a schematic diagram of an electric energy transmitted to a holder via a spindle fixing portion and a shaft rotating portion.
Figure 6:
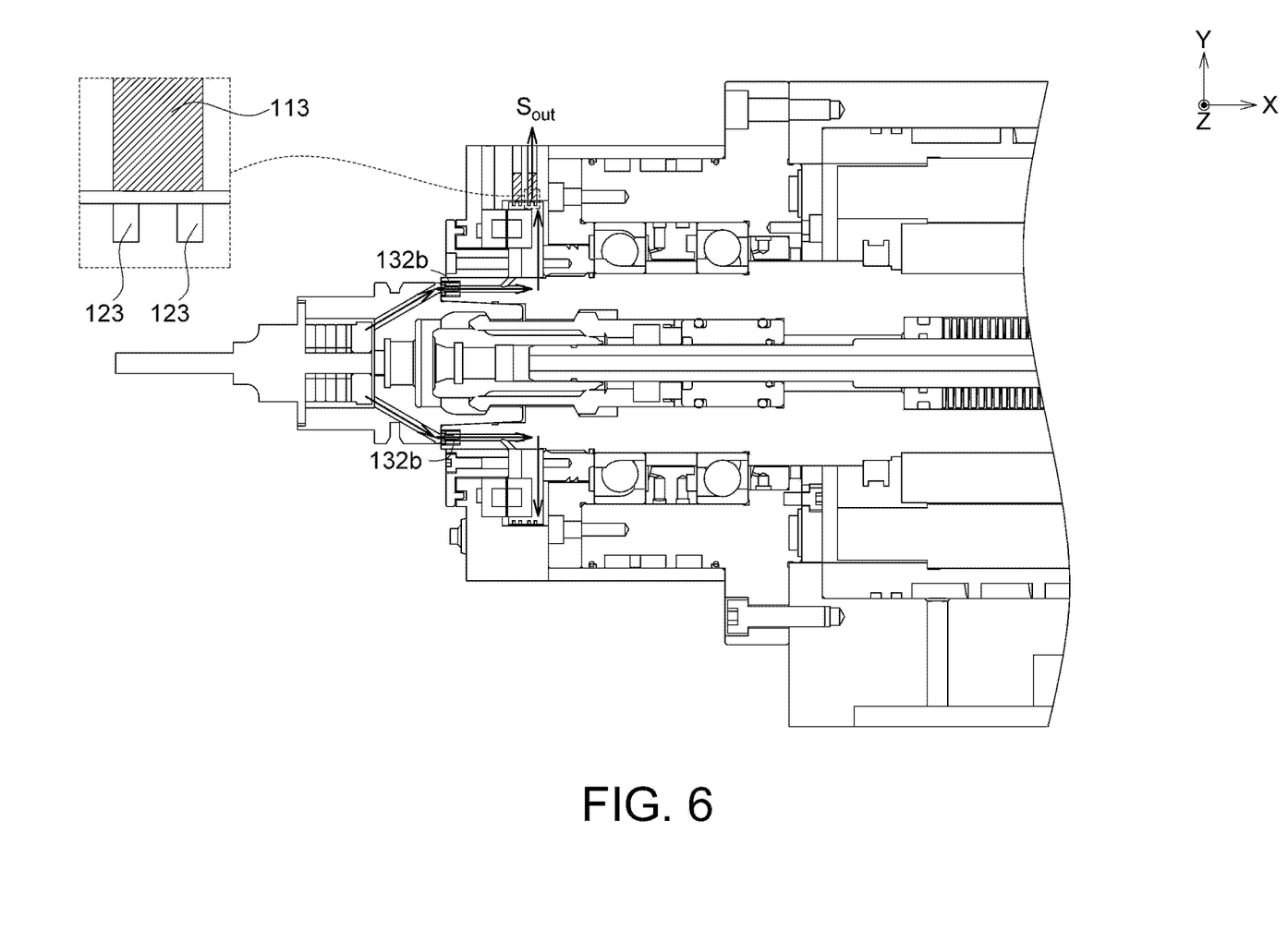
FIG. 6 is a schematic diagram of a holder signal transmitted to a shaft rotating portion and a spindle fixing portion via a holder.

As indicated in FIG. 5 and FIG. 6, the elastic pogo pins 132 include a set of elastic pogo pins 132a connected to the secondary side power induction coil 122 for transmitting an electric energy, and plural sets of elastic pogo pins 132b connected to the primary side signal induction coil 123 for transmitting a signal. The elastic pogo pins 132a are configured to transmit an electric energy to the holder 101, and the elastic pogo pins 132b are configured to transmit a signal of the holder 101 to the spindle end.

Refer to FIG. 3A and FIG. 5 simultaneously. As indicated in the arrows of FIG. 5, the power input end 111 is configured to receive an electric energy $P_{in}$. The electric energy $P_{in}$ can be transmitted to the set of elastic pogo pins 132a via the electromagnetic induction between the primary side power induction coil 112 and the secondary side power induction coil 122. Then, the electric energy $P_{in}$ is transmitted to the holder 101 from the elastic pogo pins 132a to provide a power to the oscillator 104 inside the holder 101. Refer to FIG. 3A and FIG. 6 simultaneously. As indicated in the arrows of FIG. 6, the signal $S_{out}$ of the acceleration gauge 105 and thermometer 106 inside the holder 101 (the signal $S_{out}$ can be one or both of the vibration sensing signal and the temperature sensing signal or includes more other types of sensing signals) can be transmitted to the shaft rotating portion 120 via each set of elastic pogo pins 132b. Then, the signal $S_{out}$ is transmitted to the signal output ends 114a and 114b respectively via the electromagnetic induction between the primary side signal induction coil 123 and the secondary side signal induction coil 113, such that the controller of the spindle 100 can receive the signal of the holder 101.

According to the power and signal transmission device for the spindle of the machine tool disclosed in above embodiments of the disclosure, the features of frequent assembly/disassembly elements are used in the electric energy and/or the signal transmission component of the spindle to overcome the complication of mechanical conduction design (such as brush), not only greatly simplifying electrical conduction, but also prolonging the lifespan, stabilizing conduction, and meeting the requirement of quick replacement of the tool. Furthermore, the elastic pogo pins, having the features of small volume, high current resistance (such as 5 Ampere), and easy maintenance, are easy to install, incur lower cost, and meet the requirement of frequent assembly/disassembly of the spindle end and the holder.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A power and signal transmission device for a spindle of a machine tool, comprising:
   a spindle fixing portion provided with a power input end, a primary side power induction coil, a secondary side signal induction coil and at least one signal output end;
   a shaft rotating portion provided with a joining end surface for bonding to a holder, a secondary side power induction coil and a primary side signal induction coil, wherein the shaft rotating portion is rotatable with respect to the spindle fixing portion;
   a power transmission component disposed on the joining end surface of the shaft rotating portion and coupled to the secondary side power induction coil for transmitting an electrical energy from the power input end; and
   at least one signal transmission component disposed on the joining end surface of the shaft rotating portion and coupled to the primary side signal induction coil for transmitting a holder signal to the signal output end, wherein each of the power transmission component and the at least one signal transmission component individually comprises at least one elastic pogo pin,
   wherein a force applied to the elastic pogo pin is parallel to an axial direction of the shaft rotating portion, and the elastic pogo pins electrically contact a metal sheet of the holder in the axial direction.

2. The transmission device according to claim 1, wherein the signal transmission component is configured to transmit a temperature sensing signal corresponding to the holder.

3. The transmission device according to claim 1, wherein the signal transmission component is configured to transmit a vibration sensing signal corresponding to the holder.

4. The transmission device according to claim 1, wherein the primary side signal induction coil and the secondary side signal induction coil respectively surround two opposite surfaces of the shaft rotating portion and the spindle fixing portion.

5. The transmission device according to claim 1, wherein the primary side power induction coil and the secondary side power induction coil respectively surround two opposite surfaces of the shaft rotating portion and the spindle fixing portion.

6. The transmission device according to claim 1, wherein an induction direction of the primary side signal induction coil and the secondary side signal induction coil is perpendicular to an induction direction of the primary side power induction coil and the secondary side power induction coil.

7. The transmission device according to claim 1, wherein the primary side signal induction coil and the secondary side signal induction coil comprise two sets of coils opposite to each other in a radial direction, and the primary side power induction coil and the secondary side power induction coil comprise a set of coils opposite to each other in a radial direction.

8. The transmission device according to claim 1, wherein the at least one elastic pogo pin are plural and annularly disposed on the joining end surface of the shaft rotating portion.

* * * * *